(12) United States Patent
Roppelt

(10) Patent No.: US 11,156,374 B2
(45) Date of Patent: Oct. 26, 2021

(54) THERMAL-ENERGY EXCHANGE AND STORAGE SYSTEM

(71) Applicant: Michael Roppelt, Edmonton (CA)

(72) Inventor: Michael Roppelt, Edmonton (CA)

( * ) Notice: Subject to any disclaimer, the term of this patent is extended or adjusted under 35 U.S.C. 154(b) by 0 days.

(21) Appl. No.: 15/919,425

(22) Filed: Mar. 13, 2018

(65) Prior Publication Data

US 2019/0285292 A1 Sep. 19, 2019

(51) Int. Cl.
| | |
|---|---|
| *F28D 20/00* | (2006.01) |
| *F28F 5/00* | (2006.01) |
| *F24T 10/15* | (2018.01) |
| *F24F 5/00* | (2006.01) |
| *F28D 15/02* | (2006.01) |
| *F28D 20/02* | (2006.01) |

(52) U.S. Cl.
CPC ........ *F24F 5/0021* (2013.01); *F28D 15/0275* (2013.01); *F28D 20/021* (2013.01); *F28D 20/023* (2013.01); *F24T 10/15* (2018.05); *F28D 20/0052* (2013.01); *Y02B 10/10* (2013.01); *Y02B 10/40* (2013.01)

(58) Field of Classification Search
CPC . F24F 5/0021; F24F 2005/0057; F24T 10/15; F24T 2010/56; Y02B 10/40; Y02B 10/10; F28D 20/0052
USPC .............................................. 165/45; 62/260
See application file for complete search history.

(56) References Cited

U.S. PATENT DOCUMENTS

| | | | | |
|---|---|---|---|---|
| 4,277,946 A | * | 7/1981 | Bottum ................... | F25B 30/06 62/260 |
| 4,392,531 A | * | 7/1983 | Ippolito .................. | E21B 43/04 165/45 |
| 4,577,679 A | * | 3/1986 | Hibshman ........... | F28D 20/0052 165/45 |
| 5,533,355 A | * | 7/1996 | Rawlings ................ | E21B 17/18 62/260 |
| 7,647,971 B2 | * | 1/2010 | Kaminsky ............. | E21B 36/001 62/260 |
| 8,161,759 B2 | * | 4/2012 | Kidwell .................... | F28F 1/00 62/260 |
| 8,733,429 B2 | * | 5/2014 | Harrison ............. | F24D 11/0221 165/45 |

(Continued)

FOREIGN PATENT DOCUMENTS

JP 2003302108 A * 10/2003 ............. F24T 10/15

*Primary Examiner* — Leonard R Leo
(74) *Attorney, Agent, or Firm* — Finch & Maloney, PLLC; Michael J. Bujold; Jay S. Franklin

(57) ABSTRACT

A thermal-energy exchange and storage system has a borefield with a core zone and at least one capacity expansion zone. Each of the core zone and the at least one capacity expansion zone have a plurality of boreholes. The at least one capacity expansion zone is positioned outwards from and encircling the core zone and each additional capacity expansion zone is positioned outwards from and encircling the previous capacity expansion zone. A heat source is provided in fluid communication with a heat exchanger. An injection system circulates an operating fluid. The injection system has at least one U-tube installed within the plurality of boreholes and operating fluid is circulated between the at least one U-tube and the heat exchanger for transferring heat from the heat source. An extraction system is provided for extracting heat stored in the system for use in an infrastructure.

20 Claims, 13 Drawing Sheets

(56) References Cited

U.S. PATENT DOCUMENTS

| | | | |
|---|---|---|---|
| 9,310,103 B2* | 4/2016 | Wildig | F24T 10/15 |
| 10,386,098 B2* | 8/2019 | Wildig | F24D 11/0207 |
| 2004/0035141 A1* | 2/2004 | Schmidt | F24D 11/00 |
| | | | 62/260 |
| 2011/0232858 A1* | 9/2011 | Hara | F24T 10/17 |
| | | | 165/45 |
| 2012/0125019 A1* | 5/2012 | Sami | F24F 5/0046 |
| | | | 165/45 |
| 2012/0132393 A1* | 5/2012 | Pilebro | F28D 20/0034 |
| | | | 165/45 |
| 2012/0174605 A1* | 7/2012 | Huff | F28D 7/024 |
| | | | 62/120 |

* cited by examiner

THERMAL-ENERGY EXCHANGE AND STORAGE SYSTEM

FIELD OF THE DISCLOSURE

The present application relates generally to a thermal-energy exchange and storage system, more particularly it relates to a thermal-energy exchange and storage system for use in climates with seasonal temperature changes.

BACKGROUND

This section provides background information to facilitate a better understanding of the various aspects of the invention. It should be understood that the statements in this section of this document are to be read in this light, and not as admissions of prior art.

Seasonal thermal energy storage (STES) is a common umbrella term for several technologies for storing heat for periods of months or longer. The uncommon term inter-seasonal thermal storage is a better descriptor, as these systems are used in regions that have a seasonal variation in ambient temperature, which allows injection of heat to the STES at least during a portion of the year that has an average ambient temperature that is above the average yearly ambient temperature; and requires extraction of heat from the STES at least during another portion of the year that has an average ambient temperature that is below the average yearly ambient temperature.

As general examples, heat from solar thermal collectors or waste heat such as from air conditioning equipment can be gathered in hot months for space heating use anytime needed. During winter months, the stored heat is extracted as needed to provide heat to residential and commercial buildings as well as other infrastructure, and may even service district heating systems: collections of multiple buildings tied to a central heating source. Waste heat from industrial processes or the generation of electricity can similarly be stored and be used much later.

STES systems may use air handlers or heat pumps to help charge and discharge the storage during part or all of the cycle. Heat pumps use a cycle of compression, evaporation, expansion, and condensation to transfer heat between the storage system fluid and the fluid used in the infrastructure (for example, air in an HVAC system), even against the temperature gradient (i.e. from cooler fluid to hotter fluid). This can be done for both heating and cooling the infrastructure.

In some cases, a heat exchanger is used instead. Heat exchangers come in numerous designs: some use piping coils containing one fluid contained within a shell containing the other fluid, others use stacked metal plates separating alternating flows of the two fluids, and there are many more. Regardless of the design or configuration, the effect is the same: to transfer heat from a "hot" fluid to a "cold" fluid while keeping those two fluids separate.

STES systems are used on land, particularly in climates with a winter season cold enough to require indoor heating. The characteristic of soil that makes STES systems work is the fact that heat moves slowly through the soil—as slow as one meter a month. STES systems exploit this thermal inertia to inject surplus heat into the ground over the summer months and extract that heat over the winter months for use in the space heating of buildings. Many STES systems use an array of vertical bores containing heat exchanger loops to achieve this purpose. Fluid is circulated through the loops to inject heat into or extract heat from the ground. STES essentially uses the soil as a thermal battery, as opposed to a radiator, where the thermal energy is lost.

One kind of STES system is a Borehole Thermal Energy Storage (BTES) system, an example of which is the Drake Landing Solar Community located in Okotoks, Alberta, Canada and in operation since 2007. This residential community claims to get as much as 97% of their year-round heat from a district heat system that is supplied by solar heat from solar-thermal panels on the garage roofs. The Drake community also uses a BTES system in a large mass of native soil that is under a central park. The thermal exchange occurs via a cluster of 144 boreholes, drilled 37 meters into the earth. Each borehole is 155 mm in diameter and contains a simple heat exchanger, made of single loop plastic pipe, through which a water (brine) solution is circulated. No heat pumps are involved.

BRIEF SUMMARY

There is provided a thermal-energy exchange and storage (TEES) system, comprising a borefield divided into a core zone serving as a high temperature heat reservoir and at least one capacity expansion zone. Each of the core zone and the at least one capacity expansion zones contain a plurality of boreholes. The at least one capacity expansion zone is positioned outwards from and encircling the core zone, and each additional capacity expansion outwards from and encircling a prior capacity expansion zone. The thermal-depression zone is the outermost zone, positioned outwards from and encircling all of the capacity expansion zones. A heat source is provided in fluid communication with a heat exchanger. A fluid injection system is provided for circulating operating fluid through at least one U-tube that is located within the boreholes in the borefield. Operating fluid is circulated between the at least one U-tube and the heat exchanger for storing heat from the heat source. The purpose of the injection system is to store heat in the material surrounding the boreholes of the TEES system. An extraction system circulates the operating fluid between the U-tubes located in the boreholes and the infrastructure. The purpose of the extraction system is to heat or cool the operating fluid via heat transfer between the operating fluid and the borefield, followed by the transfer of the fluid to the infrastructure to be used in heating or cooling.

In one embodiment, the TEES system has a thermal depression zone. The thermal depression zone is the outermost zone positioned outwards from and encircling all of the capacity expansion zones.

In one embodiment, a thermal-depression circuit is provided that circulates operating fluid between U-tubes located in the boreholes and an atmospheric cooling coil. The purpose of the thermal-depression circuit is to cool the thermal-depression zone below ambient ground temperature by circulating during mid to late-winter.

In one embodiment, heat is transferred to the core zone until a predetermined temperature is reached. After the predetermined temperature is reached, the heat is transferred to a capacity expansion zone.

In one embodiment, the heat is transferred to the at least one additional capacity expansion zones radiating outwards from the core zone when the previous additional capacity expansion zone reaches a predetermined temperature. This relationship of additional capacity expansion zones can be extended and repeated as necessary to any number of additional capacity expansion zones. The predetermined temperatures for the core zone and the first capacity expansion zone may be different. The predetermined temperatures for any of the additional capacity expansion zones may be different. The predetermined temperature of the core zone may be higher than the predetermined temperature of the at least one additional zone. In one embodiment, the predetermined temperature of each of the at least one additional zones is different such that the predetermined temperature of the innermost additional zone is higher than the predetermined temperature of the outermost additional zone.

In one embodiment, each of the at least one additional capacity expansion zones is physically adjacent to the previous capacity expansion zone.

In one embodiment, the heat source is a device dedicated to the production of heat, such as a solar thermal collector. This heat can be injected into the TEES system for storage or immediate use.

In one embodiment, the heat production is a by-product or waste product of another process. An example of this would be the heat created when a generator produces electricity. This heat can be injected into the TEES system for storage or immediate use.

In one embodiment, the operating fluid is comprised of potable water or recycled grey water with propylene glycol solution.

In one embodiment, the U-tubes installed within the boreholes are interconnected in sets of five boreholes and are supplied operating fluid in parallel from a common header at the top of the boreholes. Each borehole in the core zone may contain one or more U-tubes connected to the common header.

In one embodiment, a water tempering tank or heat exchanger is provided. Operating fluid from the extraction system mixes with operating fluid passing through the infrastructure to temper the operating fluid to a median temperature. The tempered water is then circulated back into the infrastructure.

In one embodiment, a back-up heat source is provided for supplementing heat within the system. The back-up heat source may heat operating fluid in the water tempering tank, may heat operating fluid traveling from the water tempering tank or heat exchanger to the infrastructure or may provide heat to any other portion of the system.

In one embodiment, a control system is provided that manages the flow of heat between the heat source, the various parts of the fluid circulation system, the borefield, and the infrastructure.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

DETAILED DESCRIPTION OF THE PREFERRED EMBODIMENTS

Figure 1:
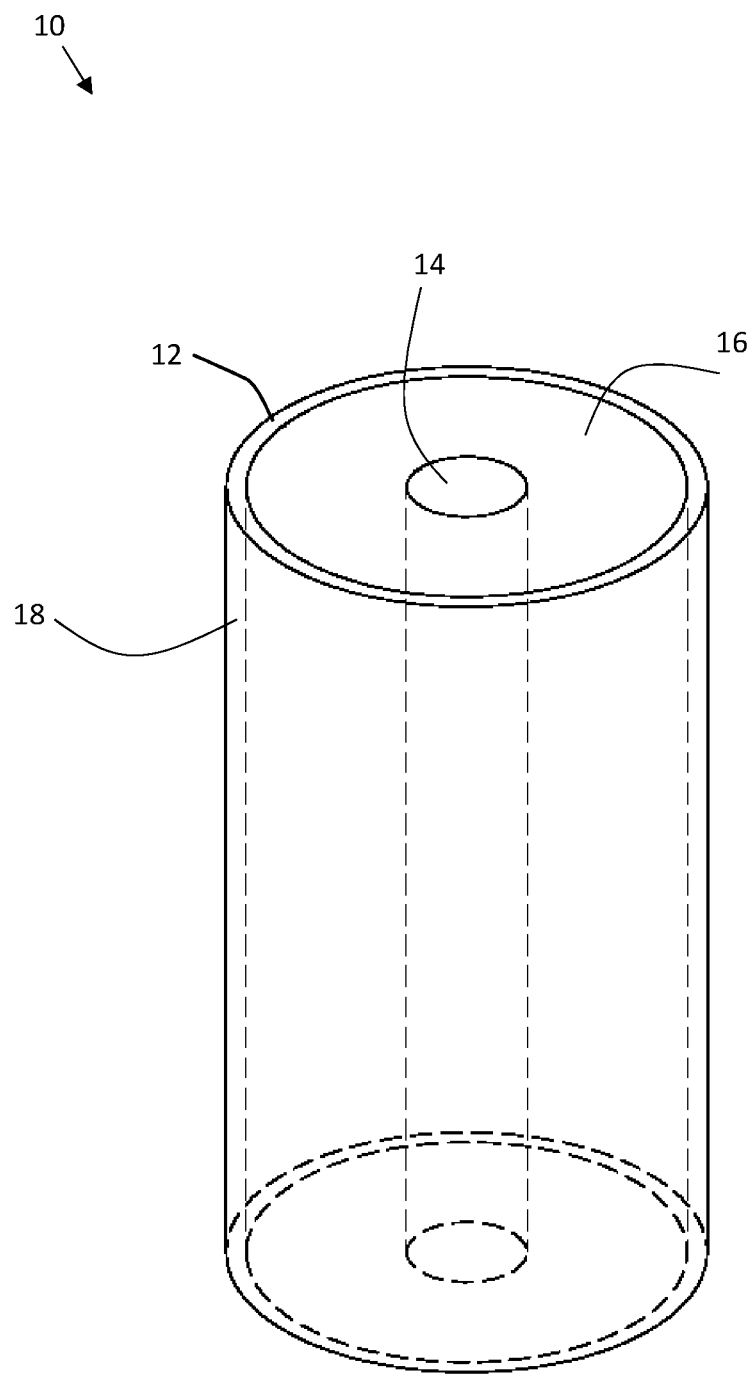
FIG. 1 is a perspective view of a TEES system.

A thermal energy exchange and storage system, generally identified by reference numeral 10, will now be described with reference to FIG. 1 through FIG. 13.

Thermal energy exchange and storage system 10 (hereafter referred to as TEES system 10) is used to store heat for later use. In the embodiment shown in FIG. 1, TEES system 10 has a borefield 12 that is divided into a core zone 14 and at least one capacity expansion zone 16 and a thermal-depression zone 18. Core zone 14, capacity expansion zone 16. Core zone 14 and capacity expansion zones 16 have a plurality of boreholes 20. Boreholes 20 are small-diameter, vertically-aligned holes drilled into the soil, earth or other material found in borefield 12. In the embodiment shown in FIG. 2, core zone 14 is made up of zones 14A and 14B which are positioned centrally relative to capacity expansion zone 16. In the same embodiment, the capacity expansion zone is made up of four zones 16A, 16B, 16C and 16D. Each capacity expansion zone 16A, 16B, 16C and 16D is positioned outwards from and encircling core zone 14. A person of skill will understand that capacity expansion zone 16 can comprise any number of zones. As can be seen, capacity expansion zone 16D is positioned outwards from and encircles capacity expansion zones 16A, 16B, 16C and core zone 14, capacity expansion zone 16C is positioned outwards from and encircles capacity expansion zones 16A, 16B and core zone 14, capacity expansion zone 16B is positioned outwards from and encircles capacity expansion zone 16A and core zone 14 and capacity expansion zone 16A is positioned outwards from and encircles core zone 14. In the embodiment shown, each of capacity expansion zones 16A, 16B, 16C and 16D are physically adjacent to the previous zone.

TEES system 10 has a heat source 22 that is in fluid communication with a heat exchanger 26. Heat source 22 can be anything that produces heat. In one embodiment, heat source 22 is a fuel-based generator that produces "waste heat" during useful work such as the generation of electricity. Electricity from this generator may be used to power the infrastructure 28, such as a complex of buildings. The use of this "waste heat" is termed cogeneration, and any generator may use a suitable fuel type, such as natural gas, diesel, biogas or syngas, to produce electricity and heat. Other types of heat sources 22 include the use of waste heat from engines or power stations used to generate electricity and useful heat or solar thermal collector panels. Waste heat from air conditioning units, heat pumps, and other devices may also be used. The equipment serving as heat source 22 is not limited to a cogeneration arrangement, and intentional heat sources 22 such as solar thermal collectors may also be used. Any heat generated, intentionally or as waste heat, may be carried by coolant pipes to heat exchanger 26.

Figure 7:
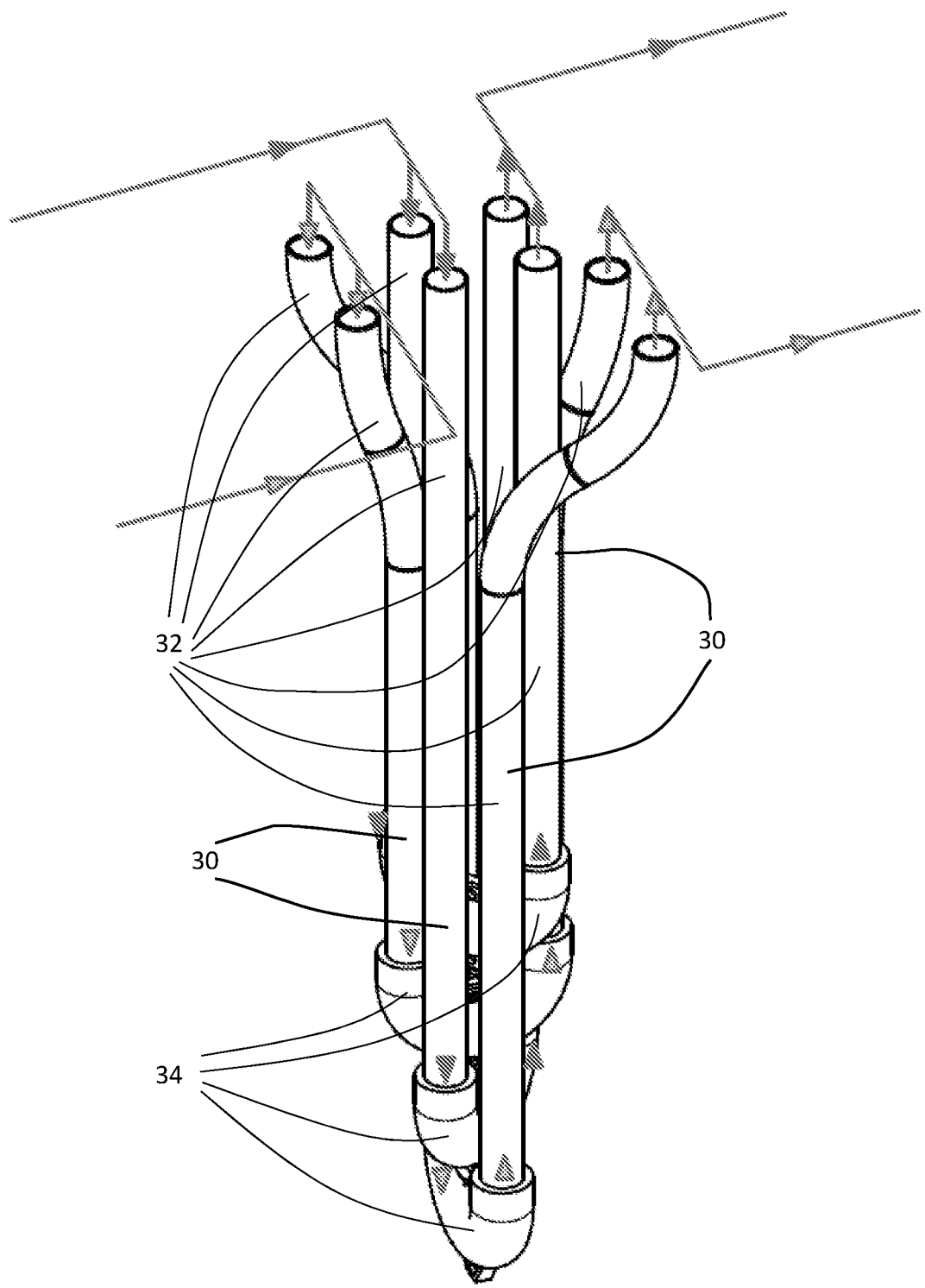
FIG. 7 is a perspective view of a borehole with two U-tubes for the injection system and two U-tubes for the extraction system installed.

Heat exchanger 26 allows for the transfer of heat from heat source 22 to injection system 24. Operating fluid circulated through vertically orientated U-tubes 30 located in boreholes 20 in borefield 12 will transfer heat to or from the ground. Each borehole 20 in core zone 14 has at least one U-tube 30 installed within it, each borehole 20 in capacity expansion zones 16 has at least one U-tube 30 installed within it. In TEES system 10, U-tubes 30 are generally constructed from two plastic pipes 32 connected to each other at the bottom of borehole 20 with a "U" shaped plastic fitting called a U-bend 34 so that operating fluid can travel down to the bottom of borehole 20 and back to the top of borehole 20 without operating fluid physically contacting material 60 of borefield 12. It will be understood by a person skilled in the art that U-tubes may be made of any other suitable material. In the embodiment shown in FIG. 6, boreholes 20 contain two U-tube s 30, connected together in parallel. Referring to FIG. 7, boreholes 20 contain four U-tube s 30, connected together such that the two operating fluid-carrying systems, the injection system 24 and the extraction system 46, are each connected to two U-tube s 30 in parallel in the same borehole 20.

Figure 8:
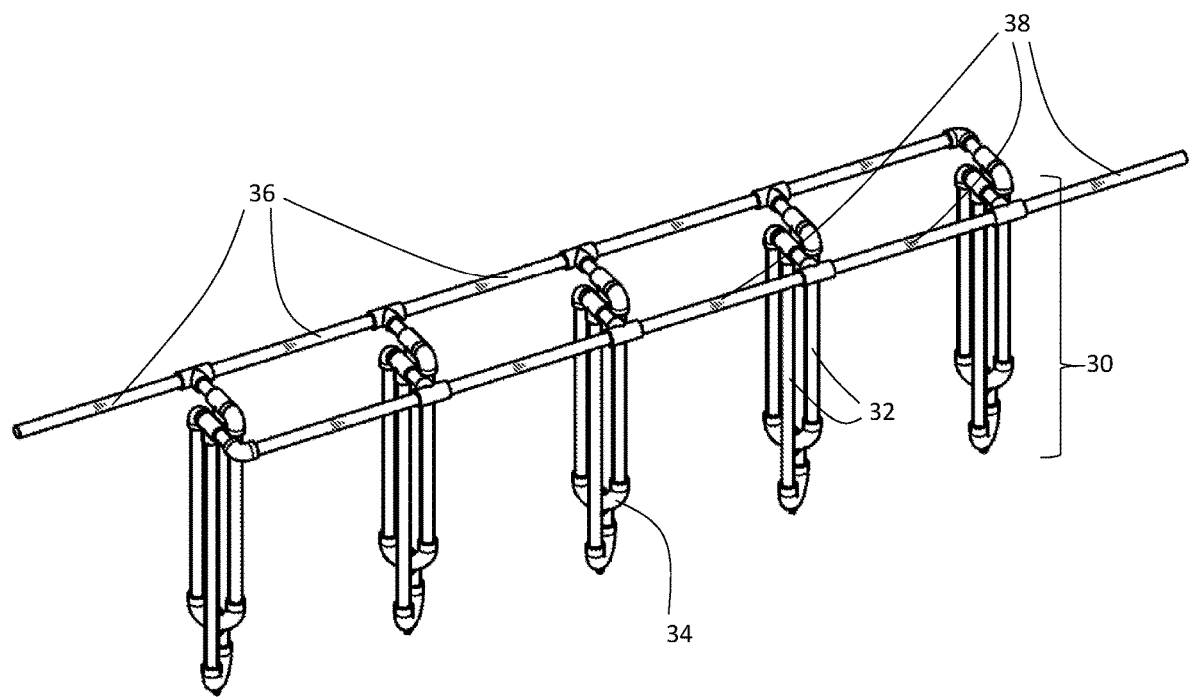
FIG. 8 is a perspective view of five boreholes, with two U-tubes in each, connected in parallel.

In the embodiment shown in FIG. 8, U-tubes 30 within boreholes 20 in borefield 12 are interconnected in groups of five boreholes 20 (can be adjacent or non-adjacent) and are supplied operating fluid in parallel from a common supply header 36 at the top of boreholes 20. Fluid flow to each U-tube 30 within borehole 20 occurs in parallel with at least one other U-tube 30. As an example, for zone 16A in the embodiment shown in FIG. 2, operating fluid is circulated through four common supply headers 36 to supply forty U-tubes 30 located in twenty boreholes 20 such that each U-tube 30 receives fluid at the same flow rate and entering temperature. Operating fluid is returned from each U-tubes 30 to a common return header 38, which carries operating fluid away from borefield 12. Parallel supply to U-tubes 30 within a ring of boreholes 20 ensures that operating fluid entering each U-tube 30 in a zone has the same temperature so that the entire zone is heated in a consistent fashion throughout. The flow configuration in the embodiment shown in FIG. 8 is called reverse-return, wherein the first borehole 20 supplied from common supply header 36 is also the first borehole 20 returning flow to common return header 38, and likewise the last borehole 20 supplied is also the last borehole 20 returned. This configuration maintains equal pressure in each U-tube 30 in the interconnected set.

Figure 2:
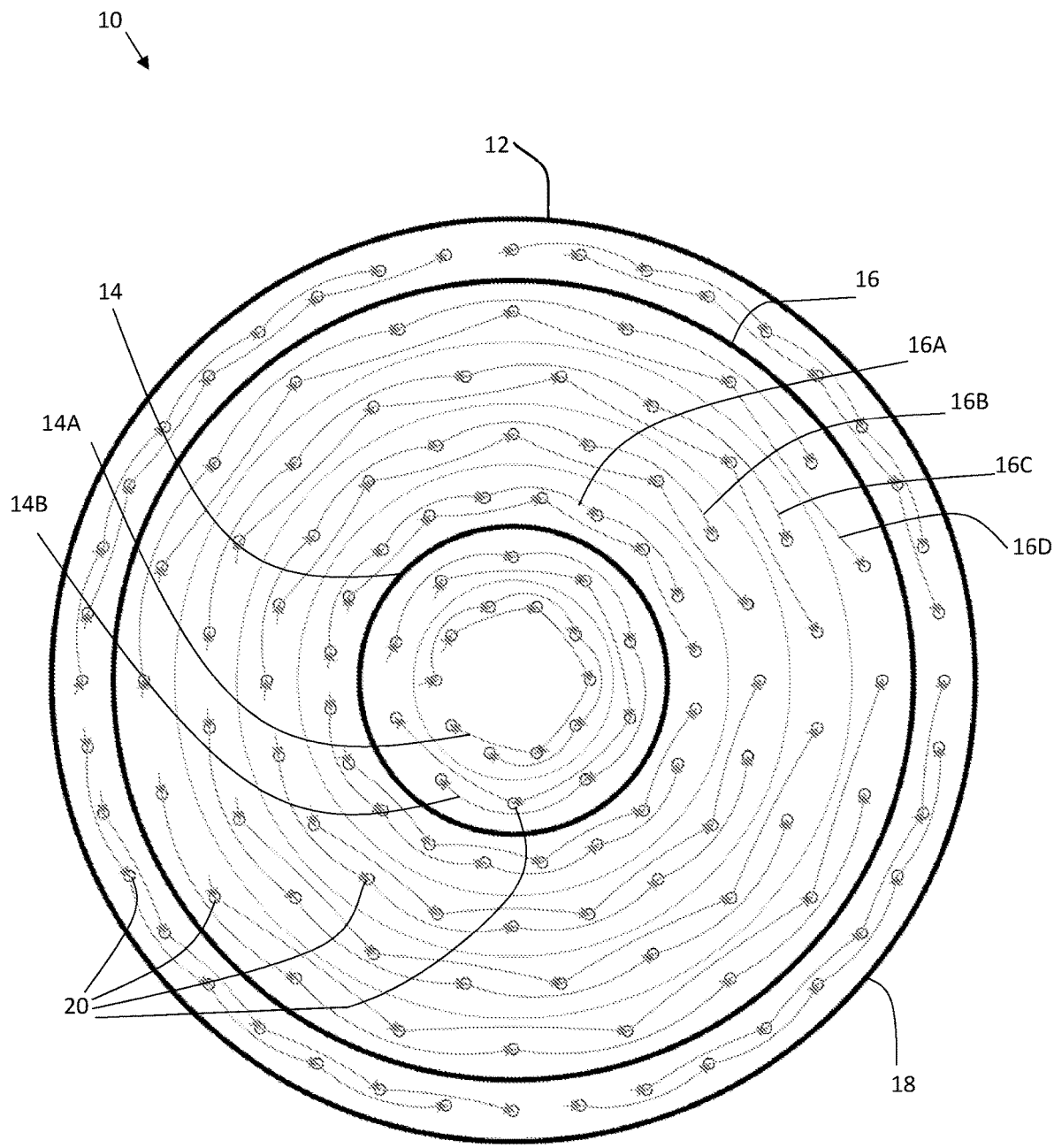
FIG. 2 is a top plan view of the borefield and arrangement of boreholes for a TEES system.

In the embodiment shown in FIG. 2, boreholes 20 within a zone of borefield 12 are arranged in a ring-shaped geometric pattern that matches the ring-shape of the zone they lie within. U-tubes 30 within these boreholes 20 are connected by common supply header 36 and common return header 38 so that the group of connected U-tubes 30 all lie within the same ring-shaped zone.

In the embodiment shown in FIG. 2, the consistency and reliability of heat distribution may be improved by directing operating fluid flow through alternating boreholes 20 by providing two common supply headers 36 for a series of ten boreholes 20. The first common supply header 36 feeds every other borehole 20 starting at a nominal pipe radial position x and including x+2, x+4, x+6, and x+8. The second common header 36 feeds every other pipe starting at pipe position x+1 and including x+3, x+5, x+7, and x+9. Each of the two common supply headers 36 feeds five boreholes 20. In this embodiment, common return header 38 is connected in an identical fashion.

Figure 3:
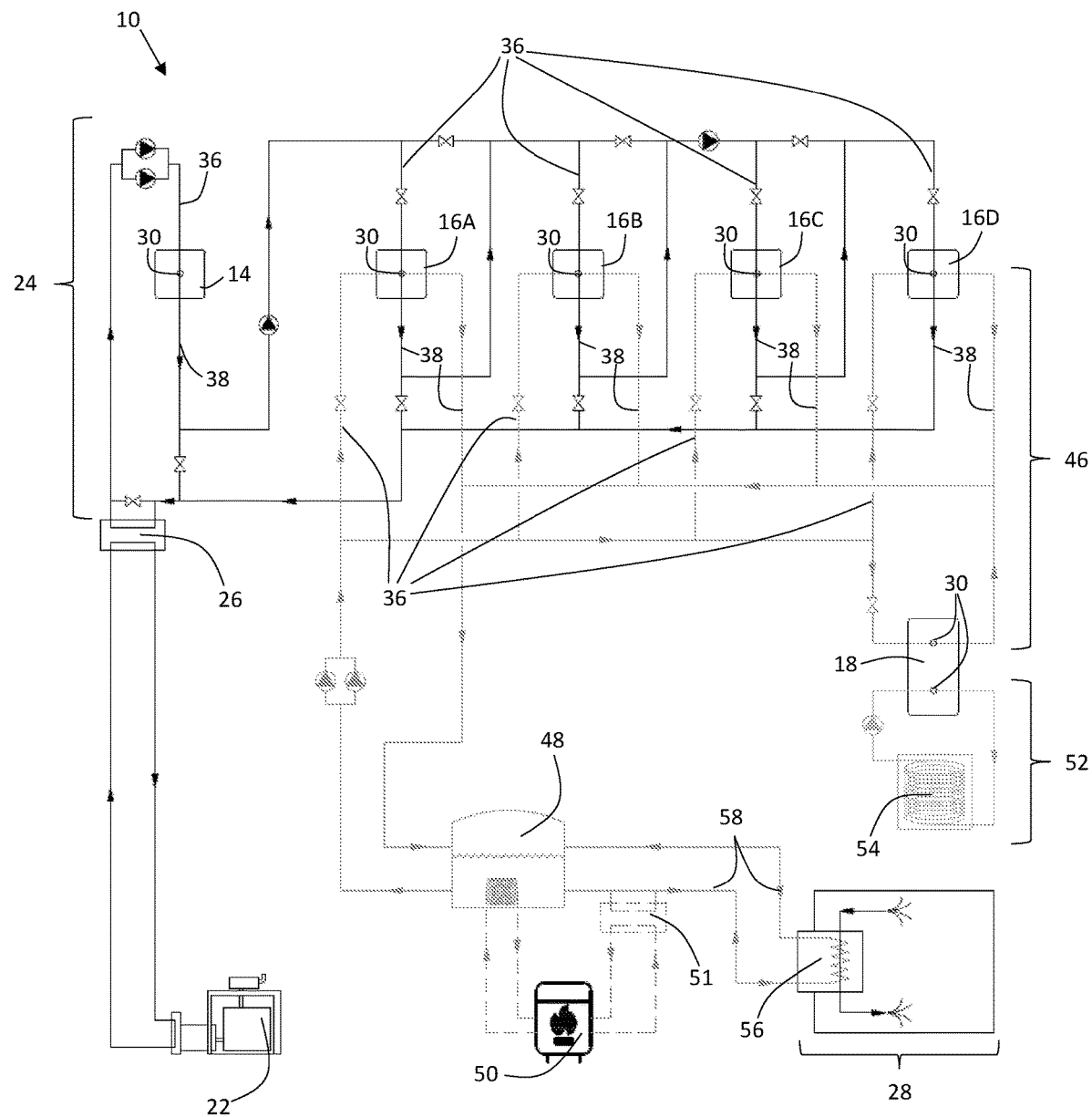
FIG. 3 is a schematic view of one embodiment of the TEES system with a direct flow of the extraction system through a soil formation piping, the water storage tank, and the infrastructure.
Figure 4:
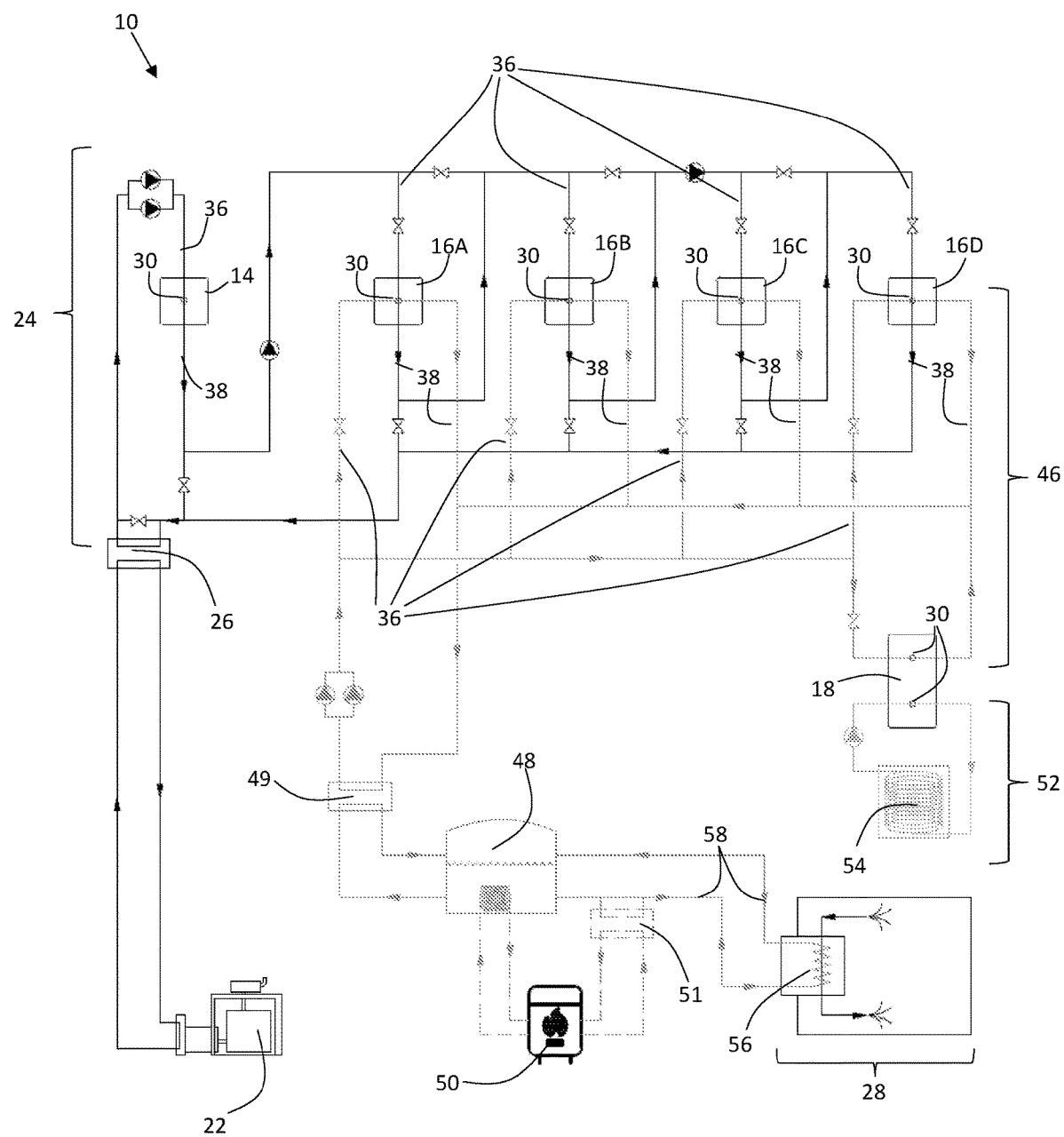
FIG. 4 is a schematic view of one embodiment of the TEES system with a heat exchanger in the extraction system separating a soil formation piping from the water storage tank and the infrastructure.
Figure 5:
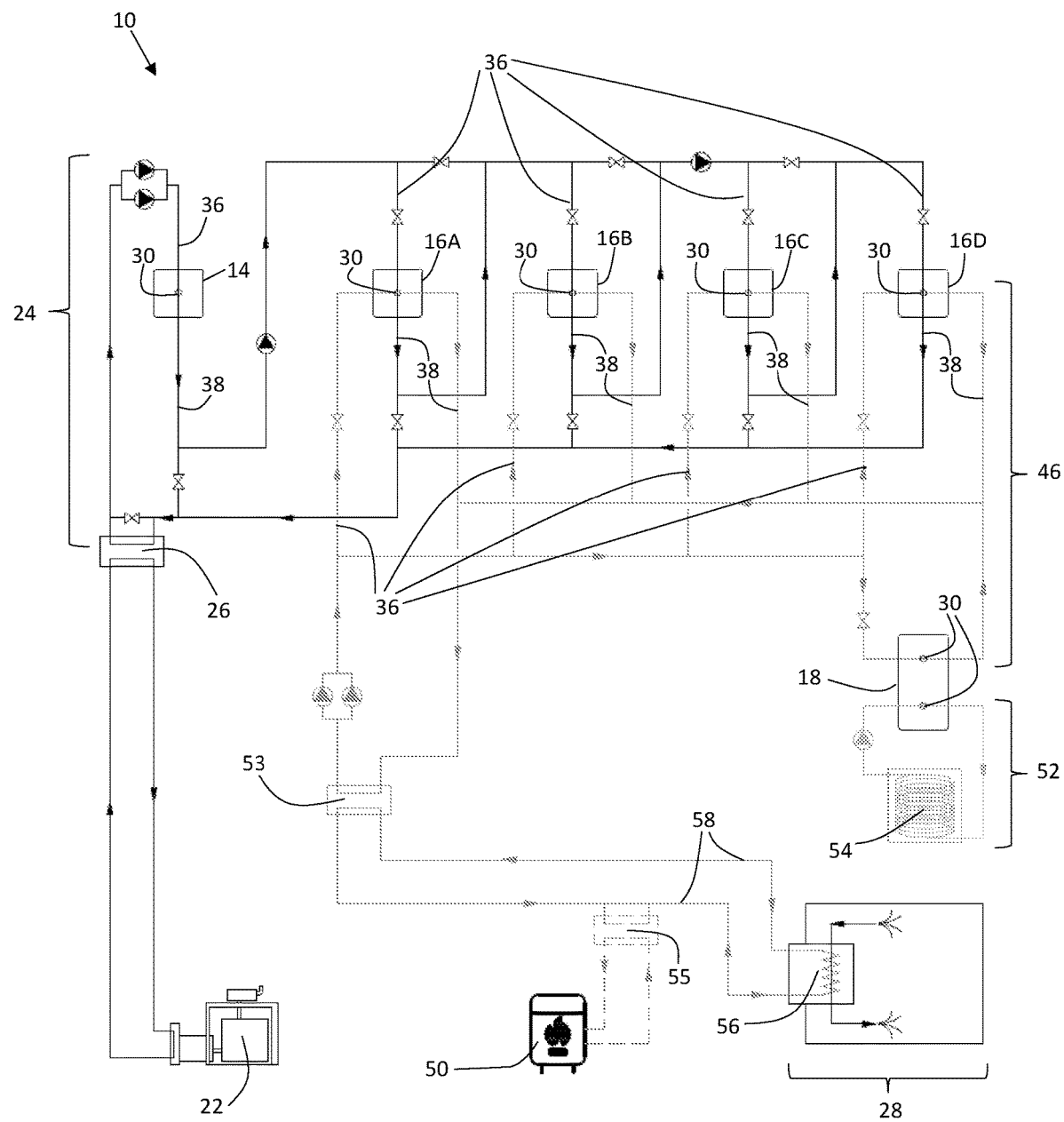
FIG. 5 is a schematic view of one embodiment of the TEES system with a heat exchanger in the extraction system separating a soil formation piping from the infrastructure and no water storage tank.
Figure 6:
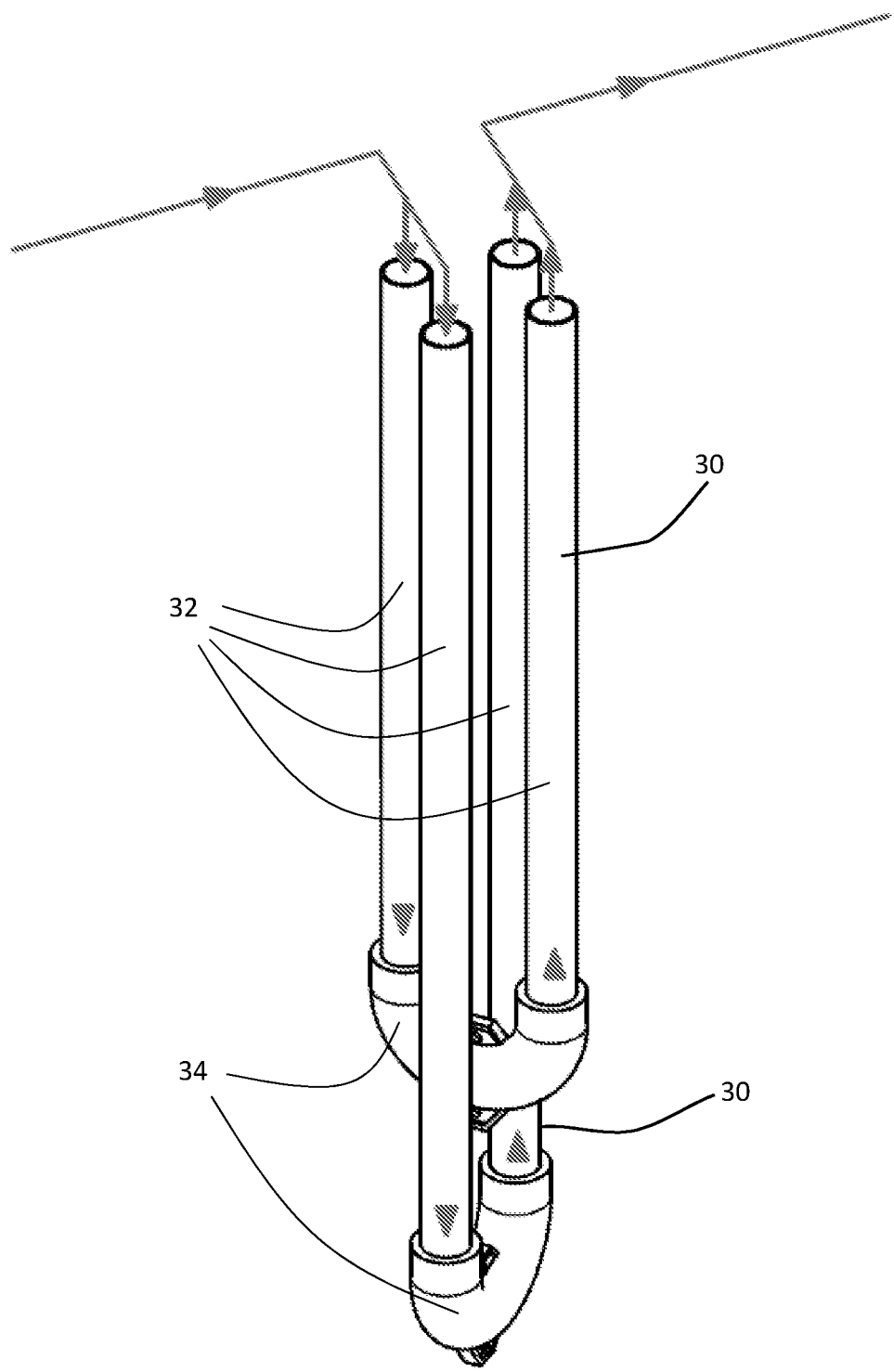
FIG. 6 is a perspective view of a borehole with two U-tubes installed.

An embodiment of injection system 24 is shown in FIG. 3, FIG. 4, and FIG. 5. In this embodiment, which is identical in all three figures, heated operating fluid is drawn from heat exchanger 26 connected to heat source 22 and directed into common supply headers 36 within core zone 14 and subsequently to capacity expansion zones 16. Common supply headers 36 directs the flow of the heated operating fluid into U-tubes 30 within boreholes 20 within core zone 14 and capacity expansion zones 16. Heat is transferred into the material 60 surrounding boreholes 20 in those zones and operating fluid is cooled. The cooled operating fluid enters the common return headers 38 and is returned to heat exchanger 26 connected to heat source 22 to be reheated and begin this cycle again.

It is preferable that operating fluid be circulated in series from core zone 14 to capacity expansion zones 16A, 16B, 16C and 16D to ensure that the hottest operating fluid is always first passed from heat source 22 into core zone 14, the innermost zone of borefield 12. This process configuration is designed to maintain the temperature of core zone 14 as always higher than the temperature of capacity expansion zones 16A, 16B, 16C and 16D.

Figure 10:
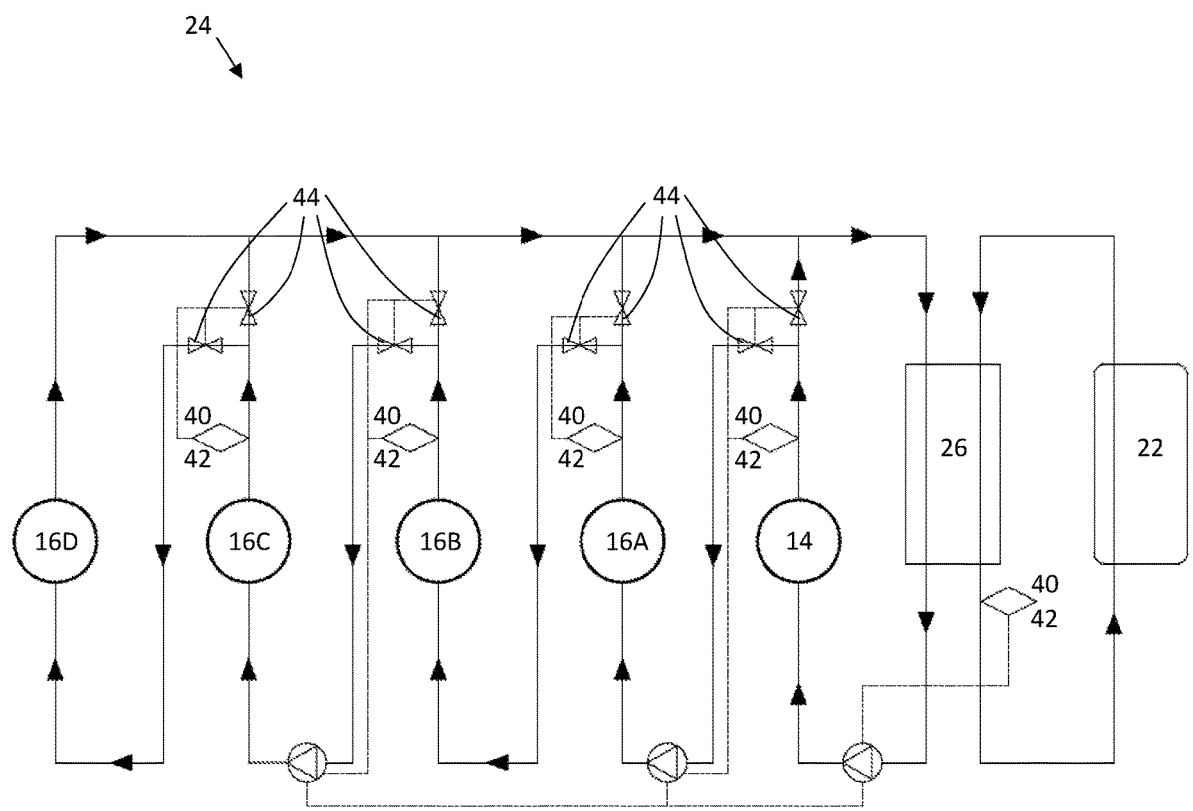
FIG. 10 is a schematic of a simple version of a TEES injection system.
Figure 11:
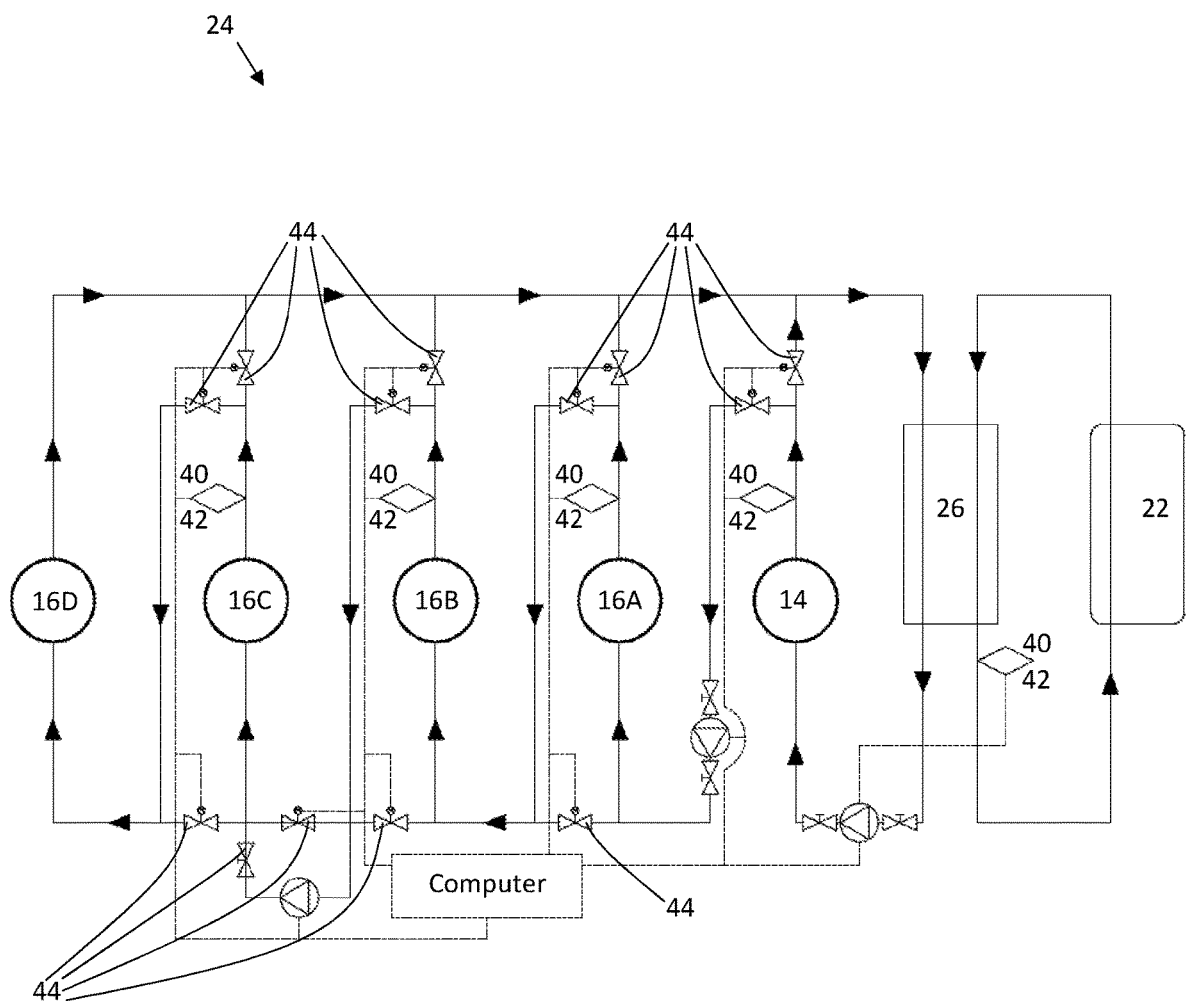
FIG. 11 is a schematic of a more complex version of a TEES injection system.

In the embodiments shown in FIG. 10 and FIG. 11 there is an automated decision-making process regarding where the flow of heat-carrying operating fluid will be directed in injection system 24. This decision-making process begins with the measurement of the temperature returning from core zone 14 or any additional capacity expansion zones 16. These measured temperatures 40 are then compared to predetermined temperature thresholds 42 for the same location. All temperature thresholds 42 are determined based on the operating temperatures of heat source 22 and injection system 24 in a specific context, and cannot be generalized except in relative terms, where thresholds 42 of zones closer to the center of borefield 12 may be higher than thresholds 42 further from the center. When measured temperature 40 rises above threshold 42, this indicates that the currently active zones of borefield 12 are too hot to transfer enough heat from operating fluid to return operating fluid to heat exchanger 26 at a low enough temperature to remove all available heat produced by heat source 22. At this point, the control valves 44 will direct operating fluid flow into capacity expansion zones 16 as appropriate to allow the removal of all available heat produced by heat source 22 through heat exchanger 26.

In the embodiments shown in FIG. 10 and FIG. 11, heat is transferred only to core zone 14 until measured temperature 40 of operating fluid returning from core zone 14 rises above threshold 42, after which heat-carrying operating fluid is also directed to at least one capacity expansion zone 16A, 16B, 16C and/or 16D.

Between capacity expansion zones 16A, 16B, 16C and 16D, heat may be transferred in a variety of different ways. In the embodiment shown in FIG. 10, heat is only transferred to capacity expansion zones 16A, 16B, 16C and 16D in sequence progressively outwards. In the embodiment shown in FIG. 11, operating fluid flow may be selectively directed to capacity expansion zones 16A, 16B, 16C and/or 16D in sequential series or in parallel.

A heat extraction system 46 is provided in communication with injection system 24 for extracting heat stored in TEES system 10 for and transferring it to infrastructure 28 for heating purposes. After a period of injection of heat into borefield 12, for example over late spring, summer and early fall, core zone 14 and capacity expansion zone 16 will be at an elevated temperature. Heat extraction may begin when desired by circulating heat-carrying operating fluid through borefield 12 in the general sequence of outermost zones first and progressing inwards. Extraction system 46 and injection system 24 may be arranged into separate systems using control valves 44 configured so that the two systems may share some or all their piping or may be arranged into separate systems through independent piping.

In one embodiment, heat is extracted from one or more capacity expansion zones 16A, 16B, 16C or 16D outward from core zone 14 by circulating operating fluid through U-tubes 30 in boreholes 20 within capacity expansion zones 16A, 16B, 16C or 16D while not circulating operating fluid in the U-tubes 30 in boreholes 20 of core zone 14. In such a fashion, the high quality of heat in core zone 14 is maintained at least initially. Embodiments of such a method proceed as follows with reference to FIG. 2, FIG. 3, FIG. 4, and FIG. 5.

In the embodiment shown in FIG. 3, extraction system 46 is directly connected to a tempering tank 48, and operating fluid from tempering tank 48 is directly circulated through U-tubes 30 of extraction system 46. Operating fluid is drawn from tempering tank 48 and directed into common supply headers 36 within capacity expansion zone 16. Common supply headers 36 direct the flow of operating fluid into U-tubes 30 within boreholes 20 of capacity expansion zone 16 where heat is transferred out of the material 60 surrounding boreholes 20 of those zones and operating fluid is heated. The heated operating fluid enters common return headers 38 and is returned to tempering tank 48 to mix with the other distribution return operating fluid in tempering tank 48. The mixed operating fluid is supplied to elements in infrastructure 28 that require heat and cool operating fluid. Optionally, a back-up heat source 50 may be connected via heat exchanger 51 to tempering tank 48 or to the pipe supplying infrastructure 28. Back-up heat source 50 is only used when the demand of infrastructure 28 exceeds the capability of extraction system 46 to supply adequate heat.

In the embodiment shown in FIG. 4, extraction system 46 is connected to tempering tank 48 via heat exchanger 49, keeping operating fluid in extraction system 46 separate from operating fluid used in tempering tank 48 and infrastructure 28. Cool operating fluid is drawn from tempering tank 48 and directed through heat exchanger 49 connected to extraction system 46. Heat is transferred from operating fluid in extraction system 46 to operating fluid of tempering tank 48, and operating heated fluid is returned to tempering tank 48 to mix with the other distribution return operating fluid in tempering tank 48. The mixed operating fluid is supplied to elements in infrastructure 28 that require heat and cool operating fluid. At the same time, operating fluid in extraction system 46 is drawn from heat exchanger 49 and directed into common supply headers 36 within capacity expansion zones 16. Common supply headers 36 direct flow of operating fluid into U-tubes 30 within boreholes 20 within capacity expansion zones 16 where heat is transferred out of material 60 surrounding boreholes 20 of those zones and operating fluid is heated. The heated operating fluid enters the common return headers 38 and is returned to heat exchanger 49 connected to extraction system 46, where heat is transferred from operating fluid in extraction system 46 to operating fluid of tempering tank 48 before beginning the cycle again. Optionally, back-up heat source 50 may be connected via heat exchanger 51 to tempering tank 48 or to the pipe supplying infrastructure 28. Back-up heat source 50 is only used when the demand of infrastructure 28 exceeds the capability of extraction system 46 to supply adequate heat.

In the embodiment shown in FIG. 5, extraction system 46 is connected to infrastructure 28 via heat exchanger 53, keeping operating fluid in extraction system 46 separate from operating fluid used in infrastructure 28. Cool operating fluid is drawn from infrastructure 28 and directed through heat exchanger 53 connected to extraction system 46. Heat is transferred from operating fluid in extraction system 46 to operating fluid of infrastructure 28, and heated operating fluid is supplied to elements in infrastructure 28 that require heat and cool operating fluid. At the same time, operating fluid in extraction system 46 is drawn from heat exchanger 53 and directed into common supply headers 36 within capacity expansion zones 16. Common supply headers 36 direct flow of operating fluid into U-tubes 30 within boreholes 20 within capacity expansion zones 16 where heat is transferred out of material 60 surrounding boreholes 20 of those zones and operating fluid is heated. The heated operating fluid enters the common return headers 38 and is returned to heat exchanger 53 connected to extraction system 46, where heat is transferred from operating fluid in extraction system 46 to operating fluid of infrastructure 28 before beginning the cycle again. Optionally, back-up heat source 50 may be connected via heat exchanger 55 to the pipe supplying infrastructure 28. Back-up heat source 50 is only used when the demand of infrastructure 28 exceeds the capability of extraction system 46 to supply adequate heat.

Figure 12:
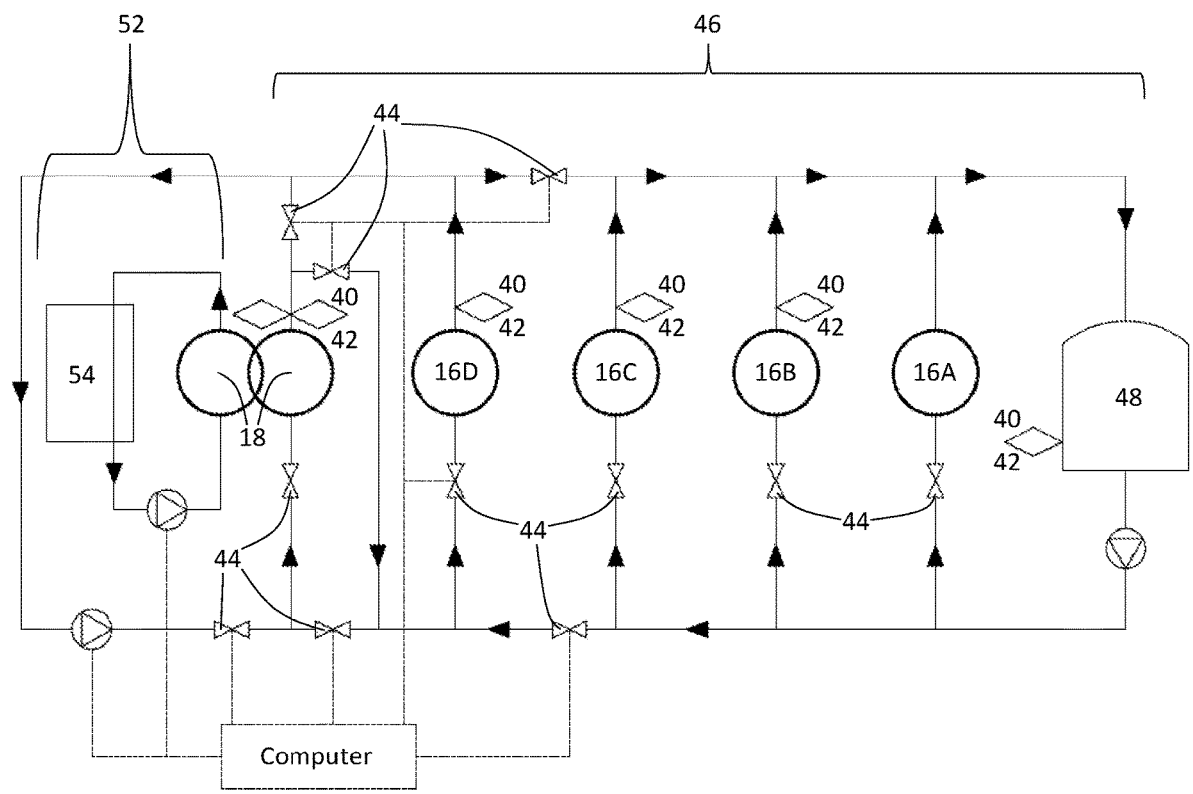
FIG. 12 is a schematic of a simple version of a TEES extraction system and thermal-depression circuit.
Figure 13:
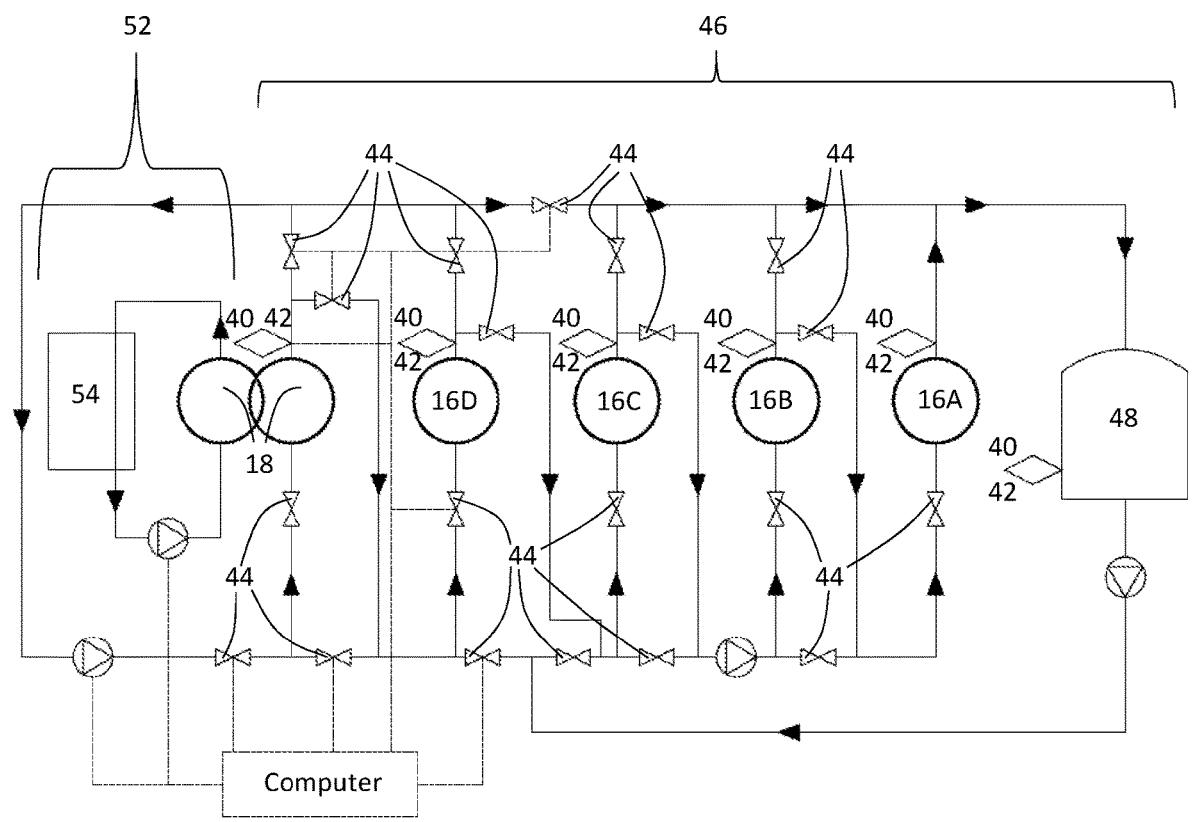
FIG. 13 is a schematic of a more complex version of a TEES extraction system and thermal-depression circuit.

In the embodiments shown in FIG. 12 and FIG. 13 there is an automated decision-making process regarding where the flow of heat-carrying operating fluid will be directed in extraction system 46. This decision-making process begins with the measurement of operating fluid temperature 40 in tempering tank 48 or operating fluid temperature returning from infrastructure 28. These measured temperatures 40 are then compared to predetermined temperature thresholds 42. All temperature thresholds 42 are determined based on the operating temperatures of extraction system 46, tempering tank 48, and infrastructure 28 in a specific context, and cannot be generalized. When measured temperature 40 of the common return headers 38 of active capacity expansion zones 16 drops below threshold 42, this indicates that the currently active zones of borefield 12 are too cold to transfer enough heat to operating fluid to return operating fluid at a high enough temperature to provide for the head demand of infrastructure 28. At this point, control valves 44 will direct operating fluid flow into additional capacity expansion zones as appropriate to allow the provision of sufficient heat to meet demand from infrastructure 28.

Between capacity expansion zones 16A, 16B, 16C and 16D, heat may be transferred in a variety of different ways. In the embodiment shown in FIG. 12, heat is selectively directed to capacity expansion zones 16A, 16B, 16C and 16D in parallel only. In the embodiment shown in FIG. 13, fluid flow may be selectively directed to capacity expansion zones 16A, 16B, 16C and/or 16D in sequential series or in parallel.

A thermal-depression circuit 52 is provided in parallel with heat extraction system 46 for extracting heat from thermal-depression zone 18 and exhausting this heat to the atmosphere. As shown in FIG. 2, thermal-depression zone 18 is the outermost zone of borefield 12, positioned outwards from and encircling capacity expansion zone 16. After a period of heat extraction from borefield 12, for example over late fall and winter, thermal-depression zone 18 can be further reduced in temperature to prepare it to receive heat rejected from infrastructure 28 during the cooling season. Reduction of temperature of thermal-depression zone 18 may begin when desired by circulating operating fluid through boreholes 20 in thermal-depression zone 18. Thermal-depression circuit 52 may be arranged into a system that is separate from either extraction system 46 or injection system 24 using control valves 44 configured so that the systems may share some or all their piping or may be arranged into separate systems through independent piping.

Temperature reduction using operating fluid chilled by low-temperature ambient air will cause thermal-depression zone 18 to have a temperature lower than the ambient soil temperature outside thermal-depression zone 18. Ambient ground temperature is an average of eight degrees Celsius (8° C.) in Edmonton, Alberta, Canada. By reducing the temperature in thermal-depression zone 18, gradual heat loss from borefield 12 to material 60 surrounding boreholes 20 is prevented. The operation of thermal-depression zone 18 outward from and surrounding capacity expansion zone 16 works because of the behavior of heat in a thermal gradient (heat moves from high temperature material to low temperature material) of material 60 making up borefield 12. Thermal depression zone 18 may also function as a heat-rejection location for heat extraction system 46.

An embodiment of thermal-depression circuit 52 is shown in FIG. 3, FIG. 4 and FIG. 5. In this embodiment, which is identical in all three figures, chilled operating fluid is drawn from an above-ground cooling coil 54 and directed into common supply headers 36 within thermal-depression zone 18. Common supply headers 36 direct flow of operating fluid into U-tubes 30 within boreholes 20 of thermal-depression zone 18 where heat is transferred out of material 60 surrounding boreholes 20 of those zones and operating fluid is heated. The heated operating fluid enters common return headers 38 and is returned to above-ground cooling coil 54 to be re-chilled and begin this cycle again.

Above-ground cooling coil 54 is a non-custom piece of equipment. It may be a passive device, relying on natural air circulation and convection, or it may be a fan-driven device, essentially a residential air-conditioner cooling tower. In either case, it is exposed to the ambient air to dissipate heat drawn from thermal-depression zone 18.

In one embodiments, thermal-depression circuit 52 uses some of U-tubes 30 or other piping that is part of injection system 24 or extraction system 46. In these embodiments, the piping required for thermal-depression circuit 52 must be isolated from the other systems by control valves 44 when it is active.

An embodiment of heat extraction system 46 connections within thermal-depression zone 18 is shown in FIG. 3, FIG. 4 and FIG. 5. Extraction system 46 has a secondary purpose of rejecting heat generated by infrastructure 28 during periods of the year when cooling may be required. Heat pumps 56 in infrastructure 28 may supply cooling to conditioned spaces, adding heat to infrastructure 28 operating fluid that needs to be rejected. When operating fluid cooling is required, heated operating fluid is drawn from infrastructure 28 and directed towards extraction system 46 as appropriate. Heated operating fluid is drawn from the connection and directed into common supply headers 36 within thermal-depression zone 18. Common supply headers 36 direct flow of operating fluid into U-tubes 30 within boreholes 20 of thermal-depression zone 18 where heat is transferred into material 60 surrounding boreholes 20 of that zone and operating fluid is cooled. The cooled operating fluid enters the common return headers 38 and is returned to the connection, beginning the cycle again.

In one embodiment of operation, capacity expansion zone 16D, which is the adjacent zone to thermal depression zone 18, may have the amount of heat injected into the zone via injection system 24 restricted, thus reducing the leakage of heat to thermal depression zone 18 over time. This may be done by reducing the number of common supply headers 36 used in injection system 24 so that only half of boreholes 20 have supply. This may be done by supplying non heated operating fluid to capacity expansion zone 16D. If other zones within capacity expansion zone 16 become hot enough to require injection into capacity expansion zone 16D, then rejected heat in extraction system 46 may be exhausted to atmosphere or used for other purposes.

In one embodiment, heat pumps 56 may be used to superheat the rejected heat within extraction system 46 and inject it into core zone 14 or higher temperature zones within capacity expansion zone 16.

In one embodiment of operation, zones within capacity expansion zone 16 may be used for rejection of heat from infrastructure 28 if material 60 surrounding boreholes 20 temperature of those zones is below that of operating fluid temperature. This functions identically to the embodiment described in relation to core zone 14 above, except that heated operating fluid can also, or instead, be directed to U-tubes 30 within boreholes 20 of capacity expansion zone 16D, or capacity expansion zone 16C.

In one embodiment of operation, thermal-depression circuit 52 may be connected to some capacity expansion zones 16 via extraction system 46, and when thermal-depression circuit 52 is active, chilled operating fluid may also be circulated through parts of extraction system 46 to reduce the temperature in capacity expansion zones 16.

In the embodiments shown, thermal-depression zone 18 is illustrated as connected to extraction system 46, however it will be understood that thermal-depression zone 18 could also only be supplied by thermal-depression circuit 52.

In the embodiments shown in FIG. 3, FIG. 4 and FIG. 5, heat-carrying operating fluid circulated through injection system 24 is one suitable for the purpose, such as a propylene glycol solution.

In the embodiments shown in FIG. 4 or FIG. 5, where extraction system 46 is separated from other systems by heat exchanger 49 and 53, respectively, a suitable heat-carrying operating fluid such as a propylene glycol solution may be circulated through extraction system 46. In the embodiment shown in FIG. 3, heat-carrying operating fluid in extraction system 46 may be a propylene glycol solution, but may comprise of potable or recycled water or some other fluid, depending on the demands of infrastructure 28.

In the embodiments shown in FIG. 3, FIG. 4, or FIG. 5, operating fluid in tempering tank 48 and infrastructure 28 may comprise recycled water such as grey water or any other suitable fluid. Grey water may be collected, for example from storm water, snow melt, or run off, from suitable locations at or near system 10. Use of recycled grey water reduces the need for a clean fluid potable water source to supply operating fluid demands.

In one embodiment, common supply headers 36 and common return headers 38 in borefield 12 may be covered by multiple layers of backfill materials such as sand. The backfill material may be covered by additional layers such as polymer spray foam insulation or hard insulation with water impermeable membranes. These additional layers may be covered with additional backfill and landscaping layers and features such as top soil, sod, asphalt, concrete, and so on.

In the embodiments shown, boreholes 18 are vertically-aligned. It will be understood by a person skilled in the art that boreholes 18 may be slanted, deviated, or any other variant types of bores.

Core zone 14, capacity expansion zones 16, and thermal depression zone 18 in borefield 12 may be concentric circular cylindrical rings as in this embodiment, or may have other suitable cross sectional and three-dimensional shapes and orientations, such as concentric elliptical rings, concentric geometric shapes or non-concentric orientations.

In one embodiment, TEES system 10 may encompass all or part of one or more aquifers. TEES system 10 employs underground thermal energy storage techniques such as aquifer thermal energy storage or cavern thermal energy storage. Borefield 12 may be sized such that complete thermal exhaustion in winter does not occur. The size of borefield 12 is, therefore, dependent on the amount of heat TEES system 10 is required to store for use within infrastructure 28.

In one embodiment, if heat transfer to borefield 12 cannot be made, for example if the formation is too hot to permit heat transfer, then heat may be transferred to a tempering tank 48, for example using one or more heat exchangers, which may comprise a fluid loop at least partially within a tempering tank 48. The temperature of tempering tank 48 may be monitored and heat extraction or injection throttled in order to temper operating fluids in tempering tank 48. Heat extraction and injection may occur simultaneously.

Other components may be incorporated into TEES system 10 as desired or required. As shown in FIG. 3, FIG. 4 and FIG. 5 there may be components such as pumps and control valves 44. Although not shown in the figures to improve clarity, there may be sensors to measure the temperature, pressure, or flow rate of operating fluid at various points in the system that are used in the controls for heat injection system 24 and heat extraction system 46. In one embodiment, there are sensors located in boreholes 20 to measure temperature throughout borefield 12. These temperature measurements can be used to calculate and analyze the ability of TEES system 10 to inject, store, and extract heat from borefield 12.

One or more heat pumps 56 may be used for regulating the temperature of operating fluid at various locations in a TEES system 10 or infrastructure 28. There may be multiple transfers of heat between operating fluids used to carry heat from material 60 surrounding boreholes 20 in capacity expansion zones 16 via extraction system 46 to tempering tank 48, to infrastructure 28, and ultimately to conditioned spaces or utility uses. In the embodiments shown in FIGS. 3 and 4, heat pump 56 may be used to transfer heat between operating fluid in extraction system 46 and operating fluid used in tempering tank 48 instead of heat exchanger 51.

In some embodiments heat pumps 56 may be used to transfer heat between operating fluid used in infrastructure 28 and local distribution systems 58. Operating fluid in local distribution system 58 may be a closed loop of water or coolant circulated for heating and cooling conditioned spaces. Operating fluid in local distribution system 58 may be an open loop of air for heating and cooling conditioned spaces, or may be an open loop of potable water supplied not just for heating and cooling but also for utility use, such as showers, consumption, domestic hot water, and other uses. Heat pumps 56 may also act as a thermostat, providing precise control of the temperature of operating fluid that is circulated in local distribution system 58.

Heat pumps 56 are advantageous because they allow thermal energy to be transferred along or against a temperature gradient (i.e. from a cooler operating fluid to a warmer operating fluid). This permits a cooler operating fluid to be supplied to infrastructure 28, resulting in lower heat loss to the environment during fluid transport. For example, the users of a building within infrastructure 28 use water at twenty-two degrees Celsius for heating. Heat pump 56 in the building can use operating fluid supplied by infrastructure 28 at eight degrees Celsius to increase the temperature of heating water circulating in the building from fifteen degrees to twenty-two degrees Celsius, while operating fluid returning to TEES system 10 via infrastructure 28 drops from eight degrees Celsius to five degrees Celsius as it passes through heat pumps 56. Due to the small difference between operating fluid temperature in infrastructure 28 and the ambient material 60 surrounding boreholes 20 temperature when traveling to and from TEES system 10, the operating fluid loses less heat to the surrounding environment, especially during winter, than it would if operating fluid in infrastructure 28 were twenty-two degrees Celsius.

Figure 9:
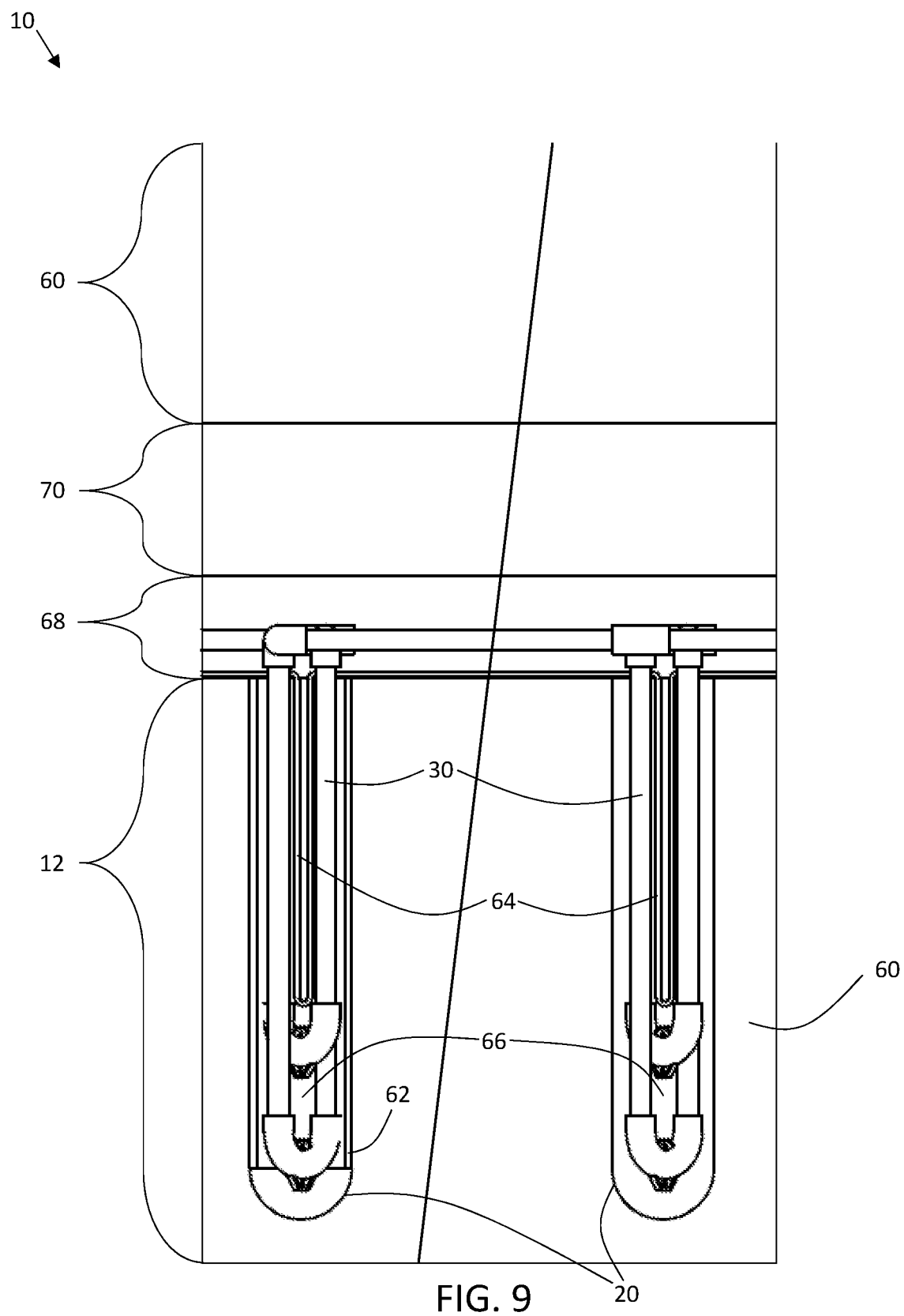
FIG. 9 is a side elevation view of the borefield construction.

In the embodiments shown in FIG. 9, the field components of TEES system 10 are shown installed within material 60 of borefield 12. Soil 60 is excavated to the top of borefield 12, and then boreholes 20 are drilled into material 60. In the embodiment shown on the left of the figure, borehole 20 is lined with a permanent casing 62 to maintain borehole 20 structure, while in the embodiment shown on the right, borehole 20 is unlined. U-tubes 30 are installed in each borehole 20 along with a distributed temperature sensing probe 64 or temperature sensors (not shown). Boreholes 20 are filled with clay-based grout 66 to seal them, and then supply headers 36 and return headers 38 are buried in sand 68 to protect them. Sand 68 is covered with insulation 70, and then insulation 70 is covered in material 60 to fill the excavated volume.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A thermal-energy exchange and storage system, comprising:
    a borefield having a core zone and at least one capacity expansion zone, each of the core zone and the at least one capacity expansion zone having a plurality of boreholes, the at least one capacity expansion zone being positioned outwards from and encircling the core zone;
    a heat source in fluid communication with a heat exchanger;

a closed injection system for circulating an injection operating fluid, the injection system comprising at least one injection system U-tube installed within each of the plurality of boreholes, the injection system circulating the injection operating fluid between the at least one injection system U-tube and the heat exchanger for transferring heat from the heat source to the injection system and the ground;

a closed extraction system in communication with the injection system for extracting the heat stored in the injection system and the ground, the extraction system circulating an extraction operating fluid, the extraction system comprising at least one extraction system U-tube installed within each of the plurality of boreholes, the extraction system circulating the extraction operating fluid between the at least one extraction system U-tube and an infrastructure to be heated;

each of the at least one injection system U-tube and the at least one extraction system U-tube installed in each of the plurality of boreholes having a pair of spaced apart upward oriented arms connected to a bottom U-bend, each of the at least one injection system U-tube and the at least one extraction system U-tube installed in each of the plurality of boreholes having the bottom U-bends stacked and positioned between the spaced apart upward oriented arms of each of the at least one injection system U-tube and the at least one extraction system U-tube previously installed in each of the plurality of boreholes;

the infrastructure to be heated being in communication with the extraction system for utilizing the heat extracted from the injection system; and the injection operating fluid being supplied to the at least one injection system U-tube in the plurality of boreholes in the core zone through at least one common header such that operating fluid enters each of the at least one injection system U-tube in the core zone at the same temperature such that the entire core zone is heated or cooled in a consistent manner, each of the at least one capacity expansion zone having at least one capacity expansion zone common header such that the injection operating fluid being supplied to the at least one injection system U-tube in the plurality of boreholes in each of the at least one capacity expansion zone enters at the same temperature such that each of the at least one capacity expansion zone is heated or cooled in a consistent manner;

wherein at least two common headers supply the injection operating fluid to the at least one injection system U-tube in alternating boreholes of each of the core zone and the at least one capacity expansion zone.

2. The thermal energy exchange and storage system of claim 1 further comprising a thermal depression zone, the thermal depression zone being an outermost zone of the at least one capacity expansion zone positioned outwards and encircling the at least one capacity expansion zone.

3. The thermal energy exchange and storage system of claim 2 wherein the temperature of the thermal depression zone is reduced by a thermal-depression circuit comprising at least one of the at least one injection system U-tube and at least one of the at least one extraction system U-tube installed within each of the plurality of boreholes of the thermal depression zone.

4. The thermal energy exchange and storage system of claim 2 wherein the depression zone has a temperature lower than an ambient material temperature outside of the thermal energy exchange and storage system.

5. The thermal energy exchange and storage system of claim 1 wherein heat is transferred to the core zone until a predetermined temperature is reached after which heat is transferred to the at least one capacity expansion zone.

6. The thermal energy exchange and storage system of claim 5 wherein there are at least a first capacity expansion zone and a second capacity expansion zone, the second capacity expansion zone being positioned outwards from and encircling the first capacity expansion zone, and heat being transferred to each of the first and the second capacity expansion zones in series radiating outwards from the core zone as each of the first and the second capacity expansion zones reach a predetermined temperature.

7. The thermal energy exchange and storage system of claim 6 wherein the predetermined temperature of each of the at least one capacity expansion zones is different such that the predetermined temperature of an innermost capacity expansion zone is higher than the predetermined temperature of an outermost capacity expansion zone.

8. The thermal energy exchange and storage system of claim 1 wherein a predetermined temperature of the core zone and the at least one capacity expansion zone are different, with the predetermined temperature of the core zone being higher than the predetermined temperature of the at least one capacity expansion zone.

9. The thermal energy exchange and storage system of claim 1 wherein there are at least a first capacity expansion zone and a second capacity expansion zone, the second capacity expansion zone being positioned outwards from and encircling the first capacity expansion zone, each of the first and the second capacity expansion zones being physically adjacent to t least one other capacity expansion zone.

10. The thermal energy exchange and storage system of claim 1 wherein the heat source is a generator.

11. The thermal energy exchange and storage system of claim 1 wherein the operating fluid comprises recycled grey water.

12. The thermal energy exchange and storage system of claim 1 wherein the operating fluid comprises propylene glycol solution.

13. The thermal energy exchange and storage system of claim 1 wherein the at least one injection system U-tube installed within each of the boreholes are interconnected in sets of five boreholes and are supplied the injection operating fluid in parallel from a common header at the top of the boreholes and the at least one extraction system U-tube installed within each of the boreholes are interconnected in sets of five boreholes and are supplied the extraction operating fluid in parallel from a common header at the top of the boreholes.

14. The thermal energy exchange and storage system of claim 13 wherein each borehole in the core zone contains two system U-tubes and two extraction system U-tubes connected to the common header.

15. The thermal energy exchange and storage system of claim 1 further comprising a tempering tank in fluid communication with the extraction system, the extraction system transferring heat to the tempering tank and the tempering tank supplying heat to the infrastructure.

16. The thermal energy exchange and storage system of claim 15 wherein a back-up heat source is provided for supplementing heat from the extraction system.

17. The thermal energy exchange and storage system of claim 16 wherein the back-up heat source heats the extraction operating fluid in the tempering tank.

18. The thermal energy exchange and storage system of claim 16 wherein the back-up heat source heats the extraction operating fluid traveling from the tempering tank to the infrastructure.

19. The thermal energy exchange and storage system of claim 15 wherein a heat pump transfers heat between the extraction operating fluid traveling from the tempering tank to the infrastructure and the extraction operating fluid traveling from the infrastructure to the tempering tank.

20. The thermal energy exchange and storage system of claim 1 further comprising a control system, the control system being programmed to maintain heat transfer into and out of the core zone and the at least one capacity expansion zone above predetermined thresholds.

* * * * *